US012315436B2

(12) United States Patent
Lin et al.

(10) Patent No.: US 12,315,436 B2
(45) Date of Patent: May 27, 2025

(54) DISPLAY PANEL AND PIXEL CIRCUIT THEREOF

(71) Applicant: AUO Corporation, Hsinchu (TW)

(72) Inventors: Chih-Lung Lin, Tainan (TW); Yi-Jui Chen, Tainan (TW); Cheng-Han Ke, Tainan (TW); Ming-Yang Deng, Hsinchu (TW); Chia-Tien Peng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/774,893

(22) Filed: Jul. 16, 2024

(65) Prior Publication Data

US 2025/0029550 A1 Jan. 23, 2025

(30) Foreign Application Priority Data

Jul. 21, 2023 (TW) ................................ 112127343

(51) Int. Cl.
*G09G 3/32* (2016.01)

(52) U.S. Cl.
CPC ....... *G09G 3/32* (2013.01); *G09G 2320/0233* (2013.01); *G09G 2330/021* (2013.01)

(58) Field of Classification Search
CPC .................................................... G09G 3/3233
See application file for complete search history.

(56) References Cited

U.S. PATENT DOCUMENTS

2015/0042692 A1* 2/2015 Kim .................... G09G 3/3233 345/82
2021/0407408 A1* 12/2021 Yang ...................... G09G 3/006

FOREIGN PATENT DOCUMENTS

CN 114446251 5/2022
CN 114566115 5/2022
CN 114974104 8/2022

* cited by examiner

*Primary Examiner* — Nan-Ying Yang
(74) *Attorney, Agent, or Firm* — JCIPRNET

(57) ABSTRACT

A display panel and a pixel circuit thereof are provided. A pulse width signal generator turns on a charge sharing switch during a light-emitting period, and performs charge sharing with a control end of a positive feedback switch of a positive feedback circuit, so as to control the positive feedback switch to provide a positive feedback voltage to the pulse width signal generator to increase a voltage at an output end of the pulse width signal generator and thus to accelerate a rising speed of a voltage for controlling a driving current generator to provide a driving current.

10 Claims, 4 Drawing Sheets

DISPLAY PANEL AND PIXEL CIRCUIT THEREOF

CROSS-REFERENCE TO RELATED APPLICATION

This application claims the priority benefit of Taiwan application serial no. 112127343, filed on Jul. 21, 2023. The entirety of the above-mentioned patent application is hereby incorporated by reference herein and made a part of this specification.

BACKGROUND

Technical Field

The disclosure relates to an electronic device, and more particularly, to a display panel and a pixel circuit thereof.

Description of Related Art

In the technical field nowadays, a pixel circuit may control a light-emitting device to emit light in a multi-emission manner, and adjust brightness and gray scales by using the pulse width modulation technology and the pulse amplitude modulation technology. However, under display conditions with low gray-scale values, if the rising time of a driving current of the light-emitting device is too long, a current used to drive the light-emitting device may not reach an expected current value, resulting in insufficient light-emitting brightness, thereby affecting display quality.

SUMMARY

The disclosure provides a display panel and a pixel circuit thereof, which may effectively accelerate a rising speed of a driving current of a light-emitting device, and ensure that the pixel circuit may still maintain current values with high light-emitting efficiency at low gray scales, reducing issues of waveform distortion and improve display quality.

A pixel circuit in the disclosure includes a light-emitting device, a driving current generator, a positive feedback circuit, and a pulse width signal generator. The light-emitting device is coupled to a power voltage. The driving current generator is coupled to the light-emitting device and provides a driving current to drive the light-emitting device. The positive feedback circuit is coupled to the pulse width signal generator, and the positive feedback circuit has a positive feedback switch. The pulse width signal generator is coupled to the driving current generator and the positive feedback circuit, and provides a pulse width signal to the driving current generator to control the driving current generator to provide the driving current. The pulse width signal generator has a charge sharing switch coupled to an output end of the pulse width signal generator. The pulse width signal generator turns on the charge sharing switch during a light-emitting period, and performs charge sharing with a control end of the positive feedback switch to control the positive feedback switch to provide a positive feedback voltage to the pulse width signal generator to increase a voltage at the output end of the pulse width signal generator and accelerate a rising speed of a voltage for controlling the driving current generator to provide the driving current.

The disclosure further provides a display panel, including multiple pixel circuits, and the pixel circuits are arranged into a display array.

Based on the above, the pulse width signal generator in the disclosure may turn on the charge sharing switch during the light-emitting period, and perform the charge sharing with the control end of the positive feedback switch, so as to control the positive feedback switch to provide the positive feedback voltage to the pulse width signal generator, increase the voltage at the output end of the pulse width signal generator, and accelerate the rising speed of the voltage for controlling the driving current generator to provide the driving current, thereby ensuring that the pixel circuit may still maintain the current values with the high light-emitting efficiency at the low gray scales, reducing the issues of waveform distortion, and improving the display quality.

DETAILED DESCRIPTION OF DISCLOSED EMBODIMENTS

Figure 1:
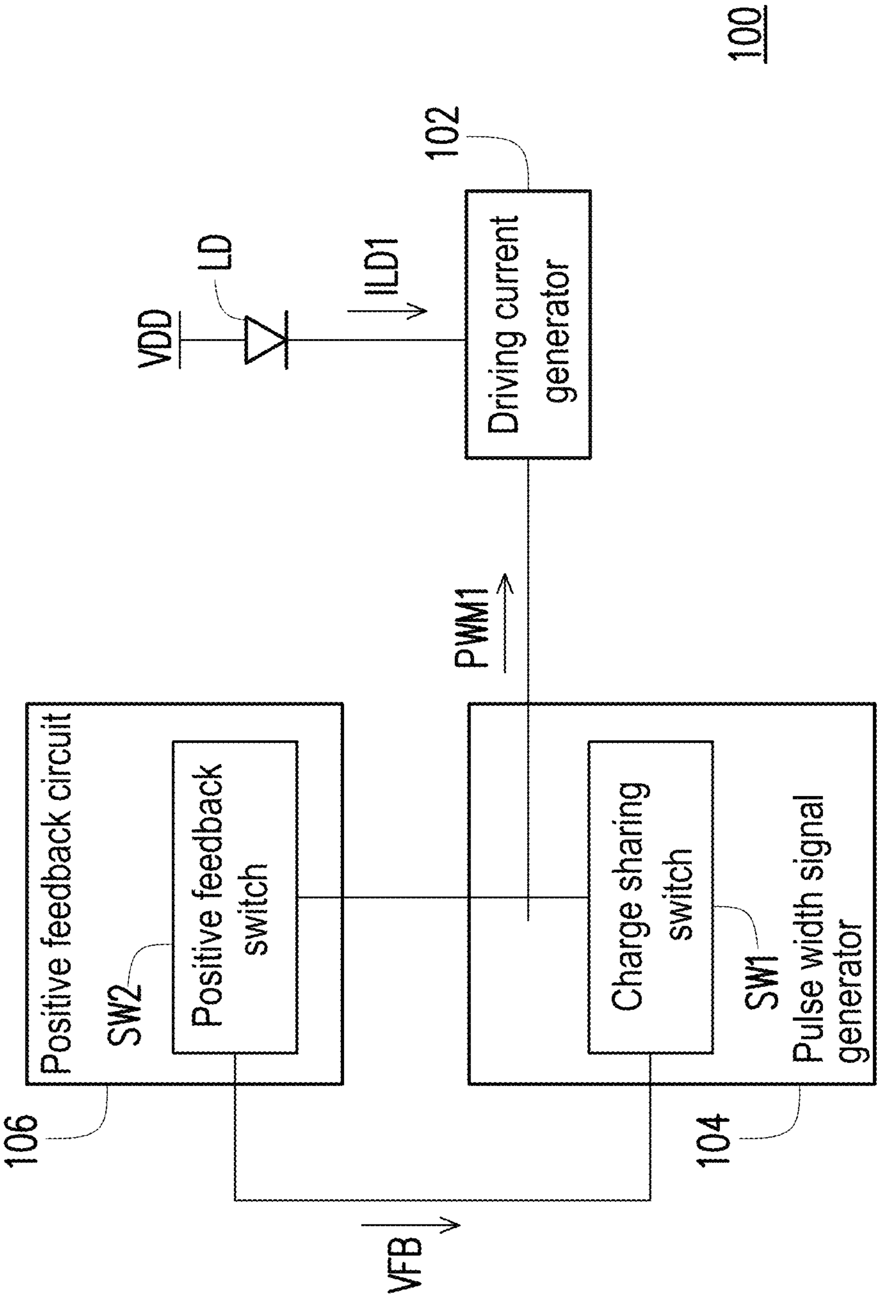
FIG. 1 is a schematic diagram of a pixel circuit according to an embodiment of the disclosure.

Referring to FIG. 1, FIG. 1 is a schematic diagram of a pixel circuit according to an embodiment of the disclosure. A pixel circuit 100 includes a light-emitting device LD, a driving current generator 102, a pulse width signal generator 104, and a positive feedback circuit 106. The light-emitting device LD may be, for example, a light-emitting diode, and an anode thereof is coupled to a power voltage VDD. A cathode of the light-emitting device LD is coupled to the driving current generator 102. The positive feedback circuit 106 is coupled to the pulse width signal generator 104.

The driving current generator 102 may provide a driving current ILD1 to drive the light-emitting device LD. The pulse width signal generator 104 may provide a pulse width signal PWM1 to the driving current generator 102 to control the driving current generator 102 to generate the driving current ILD1 to drive the light-emitting device LD to emit light. The pulse width signal generator 104 has a charge sharing switch SW1 coupled to an output end of the pulse width signal generator 104. The pulse width signal generator 104 may turn on the charge sharing switch SW1 during a light-emitting period to perform charge sharing with a control end of a positive feedback switch SW2 of the positive feedback circuit 106, and then turn on the positive feedback switch SW2, so that the positive feedback switch SW2 provides a positive feedback voltage VFB to the pulse width signal generator 104. The positive feedback voltage VFB may increase a voltage at the output end of the pulse width signal generator 104 and accelerate a rising speed of a voltage for controlling the driving current generator 102 to provide the driving current ILD1.

In this way, the positive feedback voltage VFB provided by the positive feedback switch SW2 is used to accelerate the rising speed of the voltage for controlling the driving current generator 102 to provide the driving current ILD1, which may effectively accelerate the rising speed of the driving current of the light-emitting device LD, ensure that the pixel circuit 100 may still maintain current values with high light-emitting efficiency at low gray scales, reduce issues of waveform distortion, and improve display quality.

Figure 2:
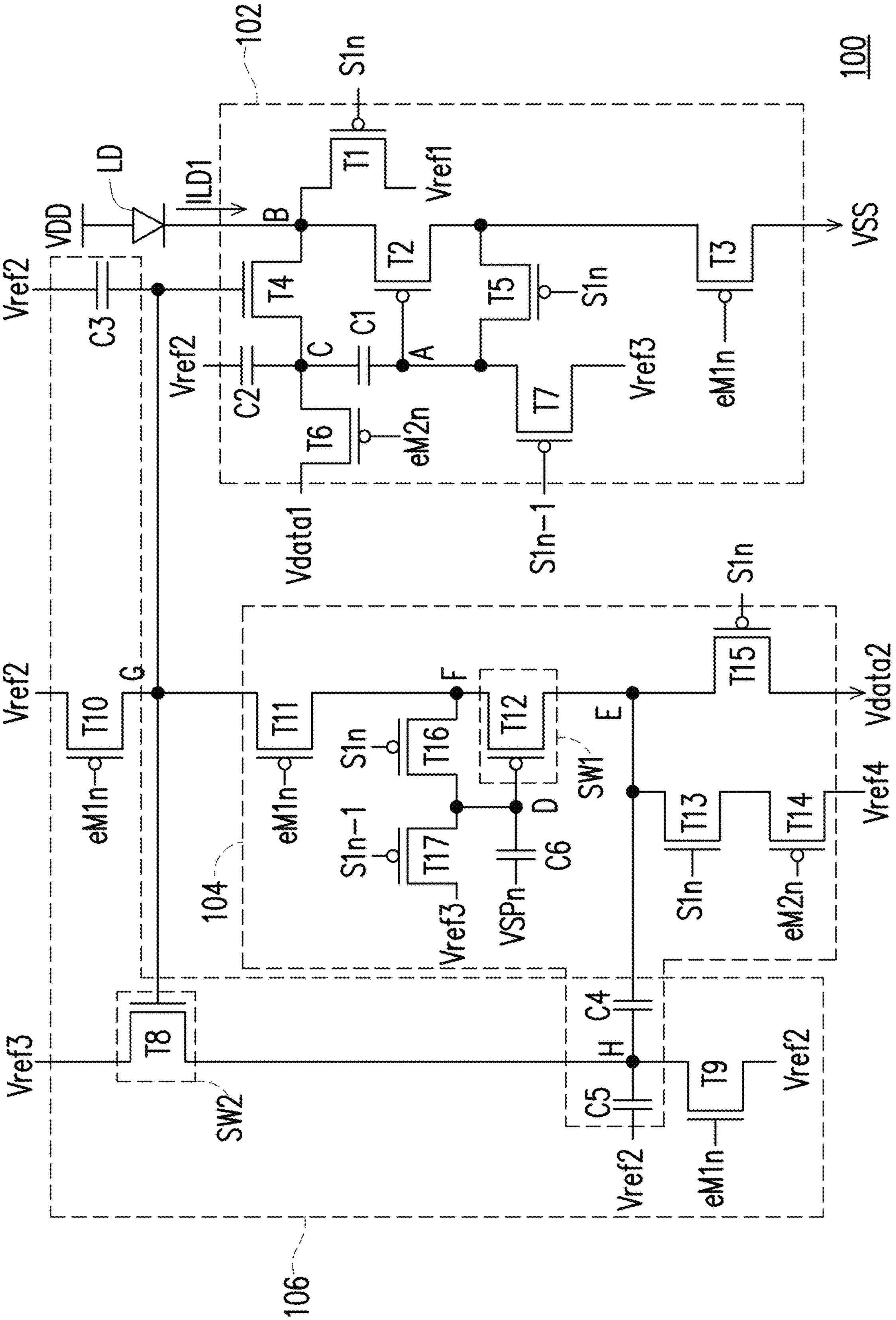
FIG. 2 is a schematic diagram of a pixel circuit according to another embodiment of the disclosure.

Furthermore, an implementation of the pixel circuit 100 may be shown in FIG. 2. In the embodiment of FIG. 2, the driving current generator 102 includes transistors T1 to T7 and capacitors C1 and C2. The transistor T1 is coupled between the cathode of the light-emitting device LD and a reference voltage Vref1. The transistors T2 and T3 are connected in series between the cathode of the light emitting-device LD and a reference ground voltage VSS. The transistors T4 and T6 are connected in series between the cathode of the light emitting-device LD and a data voltage Vdata1. The data voltage Vdata1 is used to determine a current magnitude of the driving current ILD1. The capacitor C1 is coupled between a common contact of the transistors T4 and T6 and a control end of the transistor T2. The transistor T5 is coupled between a common contact of the transistors T2 and T3 and the control end of the transistor T2. The transistor T7 is coupled between the control end of the transistor T2 and a reference voltage Vref3. The positive feedback circuit 106 may include transistors T8 and T9 and capacitors C3 to C5. The transistor T8 is used to implement the positive feedback switch SW2. The transistors T8 and T9 are connected in series between the reference voltage Vref3 and a reference voltage Vref2. A control end of the transistor T8 is coupled to a control end of the transistor T4. A transistor T10 is coupled between the reference voltage Vref2 and the control end of the transistor T4. The capacitor C3 is coupled between the reference voltage Vref2 and the control end of the transistor T4. The capacitor C4 is coupled between a common contact of the transistors T8 and T9 and the driving current generator 102. The capacitor C4 is coupled between the common contact of the transistors T8 and T9 and the reference voltage Vref2.

In addition, the pulse width signal generator 104 may include transistors T11 to T17 and capacitors C4 to C6. The transistor T12 is used to implement the charge sharing switch SW1, and the pulse width signal generator 104 and the positive feedback circuit share the capacitors C4 and C5. A first end of the transistor T11 is coupled to the control end of the transistor T4, and the transistor T16 and the transistor T17 are connected in series between the reference voltage Vref3 and a second end of the transistor T11. A first end of the transistor T12 is coupled to the second end of the transistor T11. A control end of the transistor T12 is coupled to a common contact of the transistor T16 and the transistor T17. The capacitor C6 is coupled to the control end of the transistor T12. The transistor T13 and the transistor T14 are connected in series between a second end of the transistor T12 and a reference voltage Vref4. The transistor T15 is coupled between the second end of the transistor T12 and a data voltage Vdata2. The data voltage Vdata2 is used to determine a pulse width of the pulse width signal PWM1 provided by the pulse width signal generator 104. In addition, the capacitor C4 is coupled between the common contact of the transistors T8 and T9 and the second end of the transistor T12.

Figure 3:
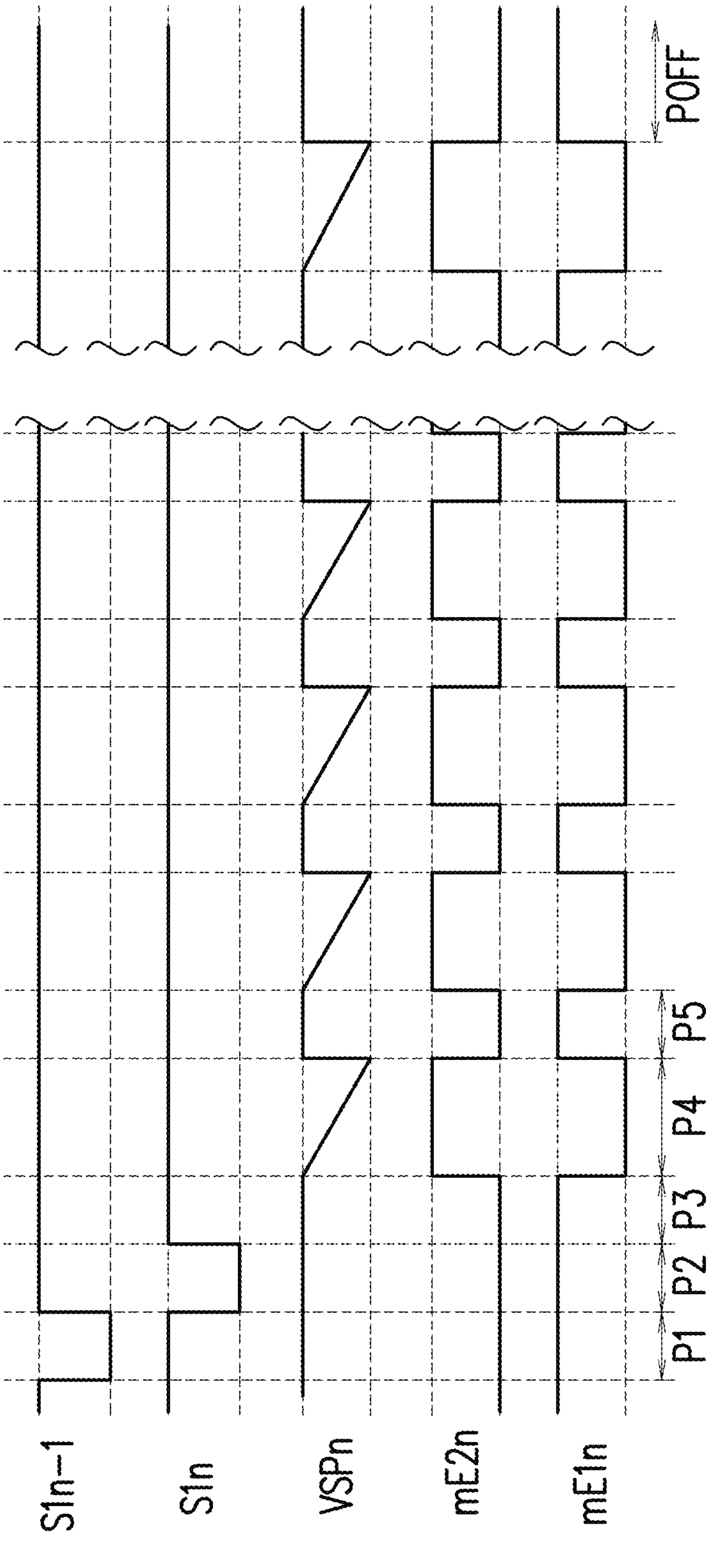
FIG. 3 is a waveform diagram of an operation of a pixel circuit according to an embodiment of the disclosure.

A waveform of an operation of the pixel circuit 100 in the embodiment of FIG. 2 may be shown in FIG. 3, for example. During a reset period P1, the transistors T7 and T17 are controlled by a pre-stage scanning signal S1_n_-1 to be turned on. The transistors T1, T5, T15, and T16 are controlled by a scanning signal S1_n_ to be turned off. The transistor T13 is controlled by the scanning signal S1_n_ to be turned on. The transistors T3 and T11 are controlled by a light-emitting control signal EM1_n_ to be turned off. The transistors T9 and T10 are controlled by the light-emitting control signal EM1_n_ to be turned on. The transistors T6 and T14 are controlled by a light-emitting control signal EM2_n_ to be turned on. The light-emitting control signal EM1_n_ and the light-emitting control signal EM2_n_ are signals with opposite phases. In addition, the transistor T2 is switched on (turned on) by the reference voltage Vref3 due to turning on of the transistor T7. The transistor T4 and T8 are switched off (turned off) by the reference voltage Vref2 due to turning on of the transistor T10. The transistor T12 is switched on by the reference voltage Vref3 due to turning on of the transistor T17. Therefore, during the reset period P1, voltages VA and VD of nodes A and D shown in FIG. 2 are equal to the reference voltage Vref3. A voltage VB of a node B is equal to the power voltage VDD minus a cross voltage VLD on the light-emitting device LD. A voltage VC of a node C is equal to the data voltage Vdata1. Voltages VE and VF of nodes E and F are equal to the reference voltage Vref4. Voltages VG and VH of nodes G and H are equal to the reference voltage Vref2. In this embodiment, a relationship between voltage magnitudes is the data voltage Vdata1>the reference voltage Vref1=the power voltage VDD>the reference voltage Vref4>the reference voltage Vref3>the reference ground voltage VSS>the reference voltage Vref2.

During a compensation and data input period P2, the pre-stage scanning signal S1_n_-1 changes from a low voltage level to a high voltage level, and the scanning signal S1_n_ changes from the high voltage level to the low voltage level. Therefore, the transistors T7 and T17 change from being turned on to being turned off, and the transistors T1, T5, T15, and T16 change from being turned off to being turned on. At this time, the voltage VA of the node A shown in FIG. 2 is equal to the reference voltage Vref1 minus a threshold voltage VTH2 of the transistor T2. The voltage VB of the node B is equal to the reference voltage Vref1. The voltage VC of the node C is equal to the data voltage Vdata1. The voltages VD and VF of the nodes D and F are equal to the data voltage Vdata2 minus a threshold voltage VTH12 of the transistor T12. The voltage VE of the node E is equal to the data voltage Vdata2. The voltages VG and VH of the nodes G and H are equal to the reference voltage Vref2.

During a stable period P3, the scanning signal S1_n_ changes from the low voltage level to the high voltage level. Therefore, the transistors T1, T5, T15, and T16 change from being turned on to being turned off. At this time, the voltage VE of the node E is changed to the reference voltage Vref4.

During a light-emitting period P4, the light-emitting control signal EM1_n_ changes from the high voltage level to the low voltage level. The light-emitting control signal EM2_n_ changes from the low voltage level to the high voltage level. A sweep voltage VSPn gradually changes from the high voltage level to the low voltage level. Therefore, the transistor T3 and T11 change from being turned off to being turned on. The transistor T6 and T14 change from being turned on to being turned off. The transistor T12 changes from being turned off to being turned on. At this time, the voltage VA of the node A shown in FIG. 2 is equal to the reference voltage Vref1 minus the threshold voltage VTH2 of the transistor T2. The voltage VB of the node B is equal to the reference voltage Vref1. The voltage VC of the node C is equal to the data voltage Vdata1. The voltage VD of the node D is equal to the data voltage Vdata2 minus the threshold voltage VTH12 of the transistor T12 and a voltage difference ΔV dropped by the sweep voltage VSPn, that is, Vdata2−VTH12−ΔV. The voltage VE of the node E is equal to the reference voltage Vref4. The voltage VF, VG, and VH of the nodes F, G, and H are equal to the reference voltage Vref2. A condition for the transistor T12 to be turned on is VE−VD>VTH12, which may be expressed as Vref2−(Vdata2−VTH12−ΔV)>VTH12, that is, Vref2−Vdata2+ΔV>0. In light of the above, the condition for the transistor T12 to be turned on has nothing to do with the threshold voltage VTH12 of the transistor T12. Therefore, variation of the threshold voltage VTH12 of the transistor T12 may be effectively avoided from affecting brightness of the light-emitting device LD, and gray-scale accuracy may be increased. Under low gray-scale display conditions, there will be no insufficient light brightness or uneven brightness, which may greatly improve the display quality.

In addition, during the light-emitting period P4, when the sweep voltage VSPn decreases, and the transistor T12 is turned on, the capacitor C4 and the capacitor C3 may perform the charge sharing, thereby turning the transistors T4 and T8 on. After the transistor T8 is turned on, the reference voltage Vref3 may be fed back to the pulse width signal generator 104 to increase the voltage at the output end of the pulse width signal generator 104. Specifically, at this time, the voltages VE, VF, and VG of the nodes E, F, and G are changed to V1+Vref3−Vref2. The voltage V1 may be represented by the following formula.

$$V1 = (Vref2 \times CS + Vref2 \times C3)/(C3 + CS) \quad (1)$$

A capacitor CS may be represented by the following formula.

$$CS = (C4 \times C5)/(C4 + C5) \quad (2)$$

In addition, the voltages VB and VC of the nodes B and C are equal to VDD−VLD. The voltage VD of the node D is equal to Vdata2−VTH12−ΔV. The voltage VH of the node H is equal to Vref3. The voltage VA of the node A is equal to VDD−VLD−Vdata1+Vref1−VTH2. Therefore, the driving current ILD1 may be represented by the following.

$$1/2\,k\,(VB - VA - VTH2)^2 = 1/2\,k\,(VDD - VLD - VDD + VLED - Vref1 + Vdata1 + VTH2 - VTH2)^2 = 1/2\,k\,(Vdata1 - Vref1)^2 \quad (3)$$

In other words, the driving current ILD1 will not be affected by a voltage drop (VDD I-R drop) of the power voltage VDD and variation of the threshold voltage VTH2 of the transistor T2, and may improve uniformity of the driving current ILD1 to improve the display quality. In addition, in this embodiment, the transistor T12 is used to trigger the charge sharing operation to turn on the transistor T8 to provide the reference voltage Vref3 as the positive feedback voltage VFB to increase the voltage (i.e. the voltage VG) at the output end of the pulse width signal generator 104, which may effectively accelerate turning on of the transistor T4, thereby accelerating the rising speed of the driving current ILD1, ensuring that the pixel circuit may still maintain the current values with the high light-emitting efficiency at the low gray scales, reducing the issues of waveform distortion, and improving the display quality. In addition, in this embodiment, only two transistors T2 and T3 are included on a driving current path where the driving current ILD1 flows, which may effectively reduce power consumption.

In another stable period P5, the light-emitting control signal EM1*n* changes from the low voltage level to the high voltage level. The light-emitting control signal EM2*n* changes from the high voltage level to the low voltage level. The sweep voltage VSPn changes from the low voltage level to the high level. Therefore, the transistors T3 and T11 change from being turned on to being turned off. The transistors T6 and T14 change from being turned off to being turned on. The transistor T12 changes from being turned on to being turned off. In addition, the transistors T2, T4, and T8 change to a turned-off state as the transistor T14 is turned on. At this time, the voltages VG and VH of the nodes G and H are changed to the reference voltage Vref2. The voltage VE of the node E is changed to the reference voltage Vref4. The voltage VA of the node A is equal to the reference voltage Vref1 minus the threshold voltage VTH2 of the transistor T2. The voltage VB of the node B is equal to the power voltage VDD minus the cross voltage VLD on the light-emitting device LD. The voltage VC of the node C is equal to the data voltage Vdata1. The voltage VD of the node D is equal to the data voltage Vdata2 minus the threshold voltage VTH12 of the transistor T12. The voltage VF of the node F is equal to V1+Vref3−Vref2.

In addition, during a turned-off period POFF, the transistors T7 and T17 are controlled by the pre-stage scanning signal S1*n*-1 to be turned off. The transistors T1, T5, T15, and T16 are controlled by the scanning signal S1*n* to be turned off. The transistor T13 is controlled by the scanning signal S1*n* to be turned on. The transistors T3 and T11 are controlled by the light-emitting control signal EM1*n* to be turned off. The transistors T9 and T10 are controlled by the light-emitting control signal EM1*n* to be turned on. The transistors T6 and T14 are controlled by the light-emitting control signal EM2*n* to be turned on. In addition, the transistors T4 and T8 are switched off (turned off) by the reference voltage Vref2 due to the turning on of the transistor T10. The transistor T2 is in the turned-off state due to the turning off of the transistor T4. The transistor T12 is in the turned-off due to the turning off of the transistor T17.

During the turned-off period POFF, the voltage VA of the node A is equal to the reference voltage Vref1 minus the threshold voltage VTH2 of the transistor T2. The voltage VB of the node B is equal to the power voltage VDD minus the cross voltage VLD on the light-emitting device LD. The voltage VC of the node C is equal to the data voltage Vdata1. The voltage VD of the node D is equal to the data voltage Vdata2 minus the threshold voltage VTH12 of the transistor T12. The voltage VE of the node E is equal to the reference voltage Vref4. The voltage VF of the node F is equal to reference voltage Vref4 plus the reference voltage Vref3 minus the reference voltage Vref2. The voltages VG and VH of the nodes G and H are equal to the reference voltage Vref2.

Figure 4:
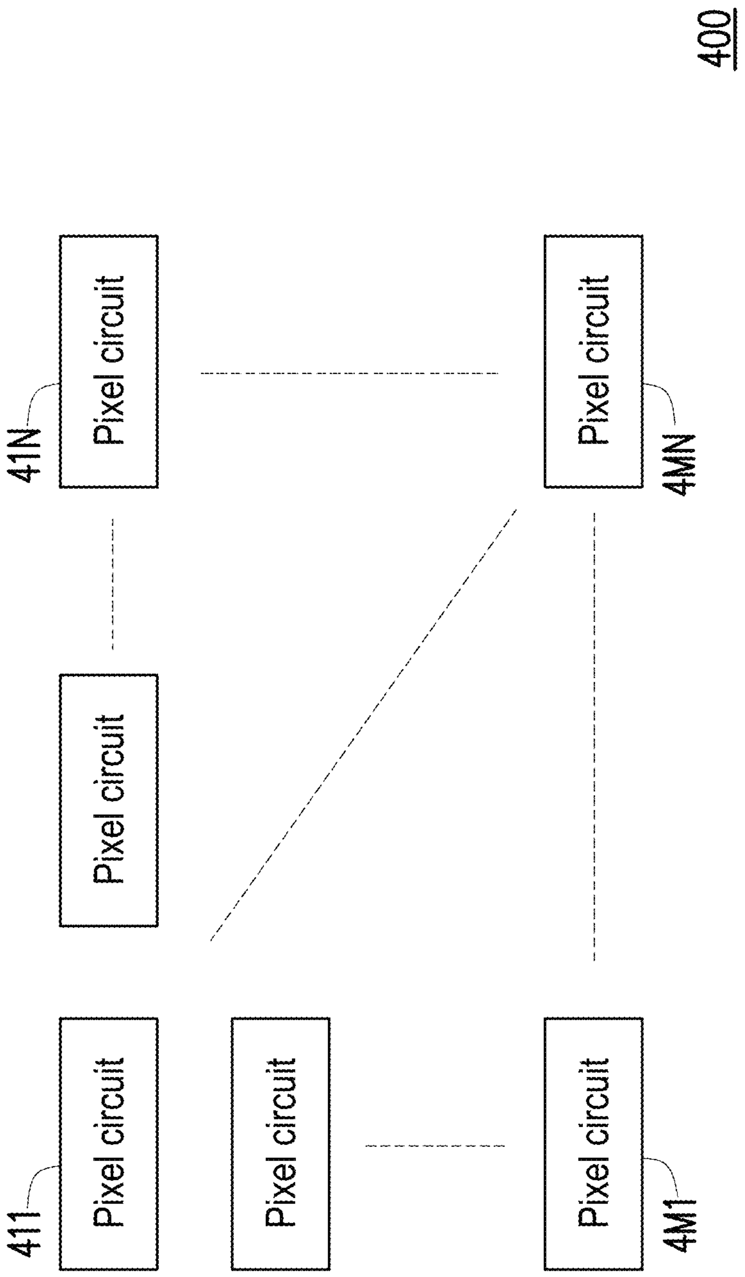
FIG. 4 is a schematic diagram of a display panel according to an embodiment of the disclosure.

FIG. 4 is a schematic diagram of a display panel according to an embodiment of the disclosure. A display panel 400 includes multiple pixel circuits 411 to 4MN. The pixel circuits 411 to 4MN may be arranged in an array. Each of the pixel circuits 411 to 4MN may be implemented using the pixel circuit 100 in the foregoing embodiment. Implementation details of the pixel circuit 100 have been described in detail in the foregoing embodiments. Therefore, the same details will not be repeated in the following.

Based on the above, the pulse width signal generator in the disclosure may turn on the charge sharing switch during the light-emitting period, and perform the charge sharing with the control end of the positive feedback switch, so as to control the positive feedback switch to provide the positive feedback voltage to the pulse width signal generator, increase the voltage at the output end of the pulse width signal generator, and accelerate the rising speed of the voltage for controlling the driving current generator to provide the driving current, thereby ensuring that the pixel circuit may still maintain the current values with the high light-emitting efficiency at the low gray scales, reducing the issues of waveform distortion, and improving the display quality.

What is claimed is:

1. A pixel circuit, comprising:

a light-emitting device coupled to a power voltage;

a driving current generator coupled to the light-emitting device and providing a driving current to drive the light-emitting device;

a positive feedback circuit coupled to the pulse width signal generator and having a positive feedback switch; and a pulse width signal generator coupled to the driving current generator and the positive feedback circuit, and providing a pulse width signal to the driving current generator to control the driving current generator to provide the driving current, wherein the pulse width signal generator has a charge sharing switch coupled to an output end of the pulse width signal generator, and the pulse width signal generator turns on the charge sharing switch during a light-emitting period, and performs charge sharing with a control end of the positive feedback switch to control the positive feedback switch to provide a positive feedback voltage to the pulse width signal generator to increase a voltage at the output end of the pulse width signal generator and accelerate a rising speed of a voltage for controlling the driving current generator to provide the driving current.

2. The pixel circuit according to claim 1, wherein the driving current generator comprises:

a first transistor coupled between the light-emitting device and a first reference voltage, wherein a control end of the first transistor receives a scanning signal;

a second transistor, wherein a first end thereof is coupled to the light-emitting device;

a third transistor coupled between a second end of the second transistor and a reference ground voltage, wherein a control end of the third transistor receives a first light-emitting control signal;

a fourth transistor, wherein an end thereof is coupled to the light-emitting device, and a control end of the fourth transistor is coupled to the output end of the pulse width signal generator;

a fifth transistor coupled between the second end and a control end of the second transistor, wherein a control end of the fifth transistor receives the scanning signal;

a sixth transistor connected in series with the fourth transistor between the first end of the second transistor and a first data voltage, wherein a control end of the sixth transistor receives a second light-emitting control signal, and the first light-emitting control signal and the second light-emitting control signal have opposite phases;

a first capacitor coupled between a common contact of the fourth transistor and the sixth transistor and the control end of the second transistor;

a second capacitor coupled between the common contact of the fourth transistor and the sixth transistor and a second reference voltage; and a seventh transistor coupled between the control end of the second transistor and a third reference voltage, wherein a control end of the seventh transistor receives a pre-stage scanning signal.

3. The pixel circuit according to claim 2, wherein during a compensation and data input period, the first transistor and the fifth transistor are controlled by the scanning signal to be turned on, the fourth transistor is controlled by the second reference voltage to be turned off, the sixth transistor is controlled by the second light-emitting control signal to be turned on, the seventh transistor is controlled by the pre-stage scanning signal to be turned off, the third transistor is controlled by the first light-emitting control signal to be turned off, and the second transistor is in a turned-on state.

4. The pixel circuit according to claim 2, wherein the positive feedback circuit comprises:

a third capacitor coupled between the control end of the fourth transistor and the second reference voltage;

the positive feedback switch that is an eighth transistor, wherein a first end of the eighth transistor is coupled to the third reference voltage, and a control end of the eighth transistor is coupled to the output end of the pulse width signal generator;

a ninth transistor coupled between a second end of the eighth transistor and the second reference voltage, wherein the control end of the eighth transistor receives the first light-emitting control signal;

a tenth transistor coupled between the control end of the fourth transistor and the second reference voltage;

a fourth capacitor coupled between the second end of the eighth transistor and the pulse width signal generator; and a fifth capacitor coupled between the second reference voltage and the second end of the eighth transistor.

5. The pixel circuit according to claim 4, wherein the pulse width signal generator comprises:

an eleventh transistor, wherein a first end thereof is coupled to the control end of the fourth transistor, and a control end of the ninth transistor receives the first light-emitting control signal;

the charge sharing switch that is a twelfth transistor, wherein a first end of the twelfth transistor is coupled to a second end of the eleventh transistor;

a thirteenth transistor;

a fourteenth transistor coupled with the thirteenth transistor between a second end of the twelfth transistor and a fourth reference voltage, wherein a control end of the thirteenth transistor receives the scanning signal, and a control end of the fourteenth transistor receives the second light-emitting control signal;

a fifteenth transistor coupled between the second end of the twelfth transistor and a second data voltage, wherein a control end of the fifteenth transistor receives the scanning signal;

a sixteenth transistor coupled between the first end and a control end of the twelfth transistor, wherein a control end of the sixteenth transistor receives the scanning signal;

a seventeenth transistor coupled between the control end of the twelfth transistor and the third reference voltage, wherein a control end of the seventeenth transistor receives the pre-stage scanning signal; and a sixth capacitor coupled between the control end of the twelfth transistor and a sweep voltage.

6. The pixel circuit according to claim 5, wherein during a compensation and data input period, the eleventh transistor is controlled by the light-emitting control signal to be turned off, the seventeenth transistor is controlled by the pre-stage scanning signal to be turned off, the thirteenth transistor is controlled by the scanning signal to be turned off, the fifteenth transistor and the sixteenth transistor are controlled by the scanning signal to be turned on, and the sixteenth transistor is in a turned-on state.

7. The pixel circuit according to claim 5, wherein during the light-emitting period, the first transistor, the fifth transistor, the fifteenth transistor, and the sixteenth transistor are controlled by the scanning signal to be turned off, the tenth transistor is controlled by the scanning signal to be turned on, the ninth transistor and the tenth transistor are controlled by the first light-emitting control signal to be turned off, the third transistor and the eleventh transistor are controlled by the first light-emitting control signal to be turned on, the sixth transistor is controlled by the second light-emitting control signal to be turned off, the seventh transistor and the seventeenth transistor are controlled by the pre-stage scanning signal to be turned off, and the twelfth transistor is controlled by the sweep control signal to change from a turned-off state to a turned-on state to perform the charge sharing, so that the eighth transistor, the fourth transistor, and the second transistor change from the turned-on state to the turned-off state.

8. The pixel circuit according to claim 5, wherein the second data voltage>the first data voltage>the first reference voltage=the power voltage>the fourth reference voltage>the third reference voltage>the reference ground voltage>the second reference voltage.

9. The pixel circuit according to claim 1, wherein the driving current generator is configured to adjust a magnitude of the driving current provided to the light-emitting device, and the pulse width signal generator is configured to adjust time of providing the driving current to the light-emitting device.

10. A display panel, comprising:

a plurality of pixel circuits according to claim 1, wherein the pixel circuits are arranged into a display array.

* * * * *